March 28, 1967 R. E. RUFFNER 3,310,896
APPARATUS FOR DISPLAYING INSURANCE DATA
Filed July 8, 1965
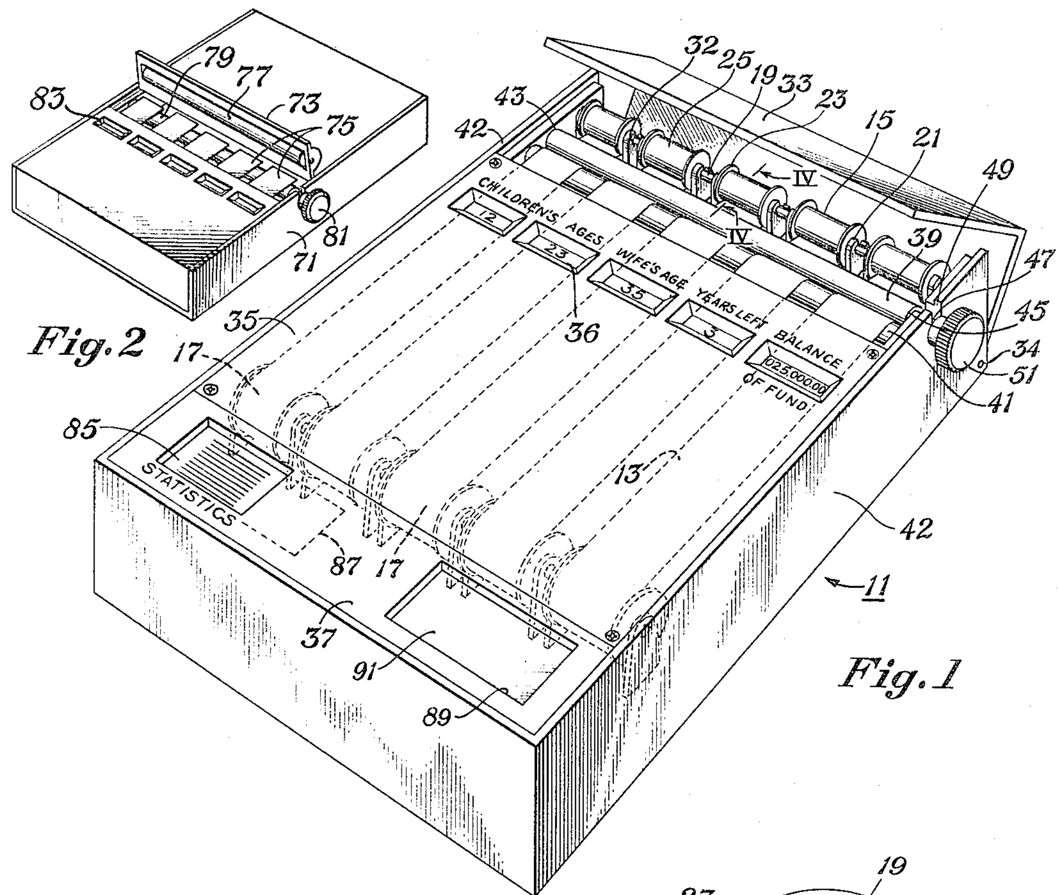
Fig. 2
Fig. 1
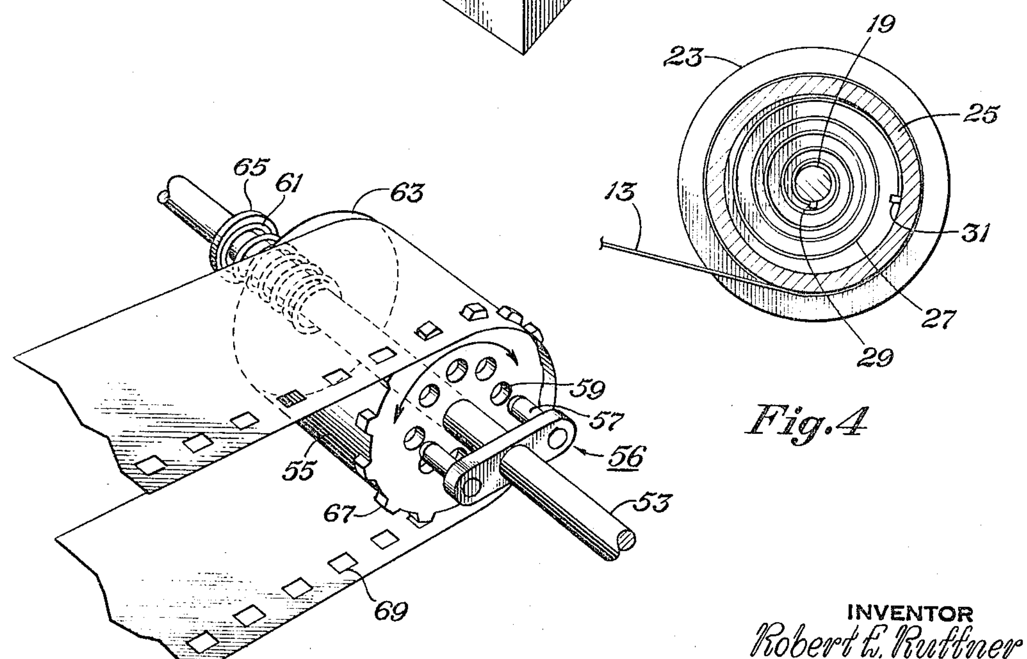
Fig. 3
Fig. 4
INVENTOR
Robert E. Ruffner
BY
Robert A. Feldman
ATTORNEY United States Patent Office 3,310,896

Patented Mar. 28, 1967

3,310,896

APPARATUS FOR DISPLAYING INSURANCE DATA

Robert E. Ruffner, 2601 Stark, Fort Worth, Tex. 76112

Filed July 8, 1965, Ser. No. 470,384
4 Claims. (Cl. 40—28)

My invention relates in general to apparatus for displaying insurance data and in particular to apparatus for dramatically demonstrating the correlation between the passage of time and the balance of an insurance fund.

Insurance needs cannot be separated from considerations of time and age. How old is the insured? How old are the insured's wife and children? How many years will the insurance fund last? What will be the balance of fund at any selected time? Time and financial needs are the core around which insurance plans are formulated.

And yet the criticality of time is difficult to dramatically and forcefully demonstrate by insurance sales representatives. In many instances sales representatives work against distracting obstacles when trying to demonstrate to a prospect the manner in which time and beneficiaries' needs rapidly exhaust an insurance fund. Charts, graphs, or illegible scribblings are frequently relied upon to demonstrate insurance needs or the depletion of an insurance fund with the passage of time. The prospect's patience and attention are usually lost in a confusing barrage of facts and figures. Thus, the significance of time and its importance in considering insurance needs are all too frequently lost by prospects or clients.

It is an object of my invention to provide a portable calculator or demonstration device for presenting insurance data in an improved manner.

Another object of my invention is to provide apparatus for displaying insurance data, said apparatus and the data being arranged in a manner such that the correlation between time and the balance of an insurance fund may be dramatically demonstrated.

Another object of my invention is to provide apparatus for displaying insurance data in a manner to dramatically correlate time and the balance of an insurance fund, said apparatus being easily adjustable so that different groupings of data may be quickly obtained.

These and other objects are effected by my invention as will be apparent from the following description, taken in accordance with the accompanying drawing, in which:

FIG. 1 is a perspective view of an insurance data display or calculating apparatus that embodies principles of my invention;

FIG. 2 is a perspective view of a modified form of my invention;

FIG. 3 is a fragmentary perspective view, showing modified means for varying the position of a data bearing tape with respect to other tapes of the apparatus; and FIG. 4 is a sectional view as seen looking along the lines IV—IV of FIG. 1.

My invention derives from the concept that there are a number of types of insurance data, such as beneficiaries' ages and the balance left in a fund, which change continuously with the passage of time. The various different types of data, if arranged in separately movable rows or on individually movable tapes and driven simultaneously by suitable drive means, may be presented in a carriage or housing in a manner such that the correlation between the passage of time and the balance of an insurance fund is dramatically demonstrated. That is, by simultaneously moving the groupings of data, the effect on the fund of the passage of time may be dramatically demonstrated. To enable demonstrations with different amounts of insurance and to enable consideration of a prospect's specific family situation, such as the age of his wife and children, the drive means is releasable to permit relative longitudinal adjustments of the data. By using such a demonstration device, the need for graphs, charts or related devices is eliminated and sales presentations presented in an improved manner.

Referring to FIG. 1 for a detailed description of one form of my invention, the numeral 11 designates a housing or carriage which contains a plurality of parallel rows of material or tapes 13. The carriage 11 is preferably elongated, as shown, and the tapes 13 are mounted for longitudinal movement therein. At opposite ends of the carriage 11 are a plurality of upper and lower tape receiving cylinders 15, 17. The purpose of these cylinders is to automatically receive respective ends of the tapes 13 and thus keep the tapes in tension.

The receiving cylinders 15, 17 of FIG. 1 are mounted to separate but coaxial shafts 19, which are supported by a plurality of pedestal structures 21. The construction of the tape receiving cylinders 15, 17 may be better seen in the sectional view of FIG. 4, where the end pieces 23 are shown extending radially outward with respect to the body 25 of the cylinder. End pieces 23 have apertures (not shown) and the shafts 19 are rotatable therein. An end portion of the associated tape is attached to the body 25 of the cylinder by suitable means such as glue and the cylinder is urged in a counterclockwise direction (as viewed in FIG. 4) by means of a helical spring 27, which is attached to the shafts 19, as designated at 29, and to the body 25, as designated at 31. The body of the housing is secured to end pieces 23.

To assemble an upper tape receiving cylinder 15 in the carriage 11, the shaft 19 is grasped with one hand and the body 25 of the cylinder rotated with the other hand against the force of helical spring 27. Then shaft 19 is inserted into slots 32 in the associated pedestal structures 21. The slots 32 and shaft 19 have an interference fit to prevent rotation of the shaft within the slot of the pedestal structure.

The cooperative action of the body 25 and the helical spring 27 of the tape receiving cylinder tends to wind the tape around the housing. The lower tape receiving cylinder 17 is identical with the upper tape receiving cylinder 15 except it is adapted to receive tape by spooling it in an opposite direction from the companion upper tape receiving cylinder 15. Thus, the helical springs of the upper and lower tape receiving cylinders keep the tape in tension when the ends of the tape are secured respectively to the upper and lower tape receiving cylinders. The friction between the tapes and the associated apparatus prevents the tapes from moving longitudinally (without manual assistance) due to the opposed helical spring forces, and thus the tape tends to remain stationary.

To change the relative positions of the tapes, a selected tape is grasped and pulled in one longitudinal direction or the other until the selected indicia appears in associated aperture 36. Then the tape is released, and the helical springs and friction keep the tape in the selected position.

An upper cover plate 33 is secured to the carriage 11 by hinge 34 to allow easy access to the tapes to permit the above described adjustments in their relative longitudinal positions. An intermediate cover plate 35 contains a plurality of apertures 36, each of which is aligned with a respective tape. Indicia which represents insurance data may be viewed through the apertures. A lower cover plate 37 completes the enclosure of the upper face of the apparatus.

Drive means are provided for simultaneously moving the plurality of tapes 13. In this instance the drive means is a pair of friction rollers 39, 41 which are rotatably secured to side wall portions 42 of the carriage. The friction rollers 39, 41 are transversely aligned with respect to the tapes 13. As shown in FIG. 1, the angle between the tapes 13 and the friction rollers 39, 41 is 90 degrees. The tapes 13 are threaded between the friction rollers, and are mutually engaged and forcefully held thereby. Thus, rotation of one of the friction rollers will move the other friction roller, and the tapes will be moved longitudinally.

Rollers 39 are movable in a direction away from the roller 41 to release the tapes so that relative longitudinal adjustments may be made for the purpose of enabling different groupings of data to be visible through the apertures 36 of the intermediate cover plate 35. In FIG. 1 the roller 39 has one end 43 pivotally secured to one side wall 42 of the carriage, and the opposite end 45 of this roller has a shaft 47 which exends through a slot 49 in the opposite side wall 42 of the carriage. Thus, roller 39 may be pivotally moved from engagement with the roller 41, and the relative positions of the tapes easily varied. A knurled control knob 51 is secured to the shaft 47 of roller 39 to enable rotational movement when the various covers of the apparatus are secured in their designated positions.

Each tape 13 has indicia thereon which represent a particular type of insurance data. The "Balance of Fund" tape on the far right of the apparatus of FIG. 1 has several distinct groupings of related data. One such group of data is a column that begins with $100,000, with each adjacent line being decreased from $100,000 by $12,000 increments. To demonstrate to a prospect or client how rapidly time exhausts a $100,000 insurance fund when the beneficiaries will require a total of $1,000 per month, the upper cover plate 33 is moved upwardly and the hinged friction roller 39 moved pivotally away from the adjacent friction roller 41. Then the "Balance of Fund" tape 13 is grasped and moved longitudinally until the numeral $100,000 associated with the data which decreases in $12,000 increments appears in aperture 36 in intermediate cover plate 35. The "Balance of Fund" tape has other groups of related data that decrease by different increments so that the rate any particular prospect's beneficiaries will exhaust an insurance fund can be reflected by using the same "Balance of Fund" tape.

Assuming that the prospect has a wife and two children, their ages are moved into view through the apertures 36 associated therewith by adjusting the tapes longitudinally in the manner previously described. The apparatus preferably has at least four tapes labeled "Children's Ages" but only two such tapes are illustrated in FIG. 1, since all would be identical with those shown. Each of these tapes has columns of numbers that begin at the top with "0" and increase to"25," for example, in increments of one. The vertical spacing between the lines is matched with the spacing of the lines of data on the "Balance of Fund" tape. When the drive means moves the tapes, the ages of the wife and the children will increase by increments of one and be visible through apertures 36, and, simultaneously, the "Balance of Fund" tape numeral will decrease by $12,000.00 (based on the beneficiaries' needs of $1,000 per month) and be visible through its associated aperture 36.

The "Years Left" tape has a column of numerals which begin with "30," for example, and decrease by increments of one until the number "0" is reached. The vertical spacing between the lines of this tape is matched with the spacing of the other tapes. If $100,000 is initially made visible through the aperture associated with the "Balance of Fund" tape and the depletion rate of the fund is $12,000 per year, then the fund will last eight years. Thus, the numeral eight is initially made visible through the aperture 36 associated with the "Years Left" tape. When the tapes are moved by the drive means, the "Balance of Fund" decreases by $12,000, for example, and simultaneously, the "Years Left" decrease by one.

When the selected groupings of data are arranged to be visible through their respective apertures 36 in the intermediate cover plate 35, the friction roller 39 is insered in slot 49 and the cover plate 33 is moved to its closed position.

By rotating the control knob 51 associated with friction roller 39, the tapes may be moved simultaneously. Thus, as each year passes the wife's and children's ages increase one, the year's left decrease by one, and the balance left in the insurance fund decreases by whatever amount is to be expended yearly by the insured's beneficiaries.

Since the tapes may be conveniently adjusted longitudinally, the apparatus may be used to demonstrate the manner time rapidly depletes insurance funds. Different groupings of data may be conveniently arranged to demonstrate how various amounts of insurance will fill the needs of the benefiicaries.

As mentioned briefly previously, the "Balance of Fund" tape contains separated groupings of data that decrease by different increments. That is, under some conditions the balance may decrease at a rate of $5,000 a year. Under other conditions the balance may decrease at a rate of $7,000; thus, the tape must have a multiplicity of groupings of data, each which decreases by a different increment.

An alternate means for simultaneously moving the various tapes is shown in FIG. 3. The shaft 53 is rotatably connected with a cylinder 55. A key coupling 56 is included on one end of the cylinder and is rigidly secured to shaft 53. The key coupling has longitudinally extending protrusions 57 that extend into annularly aligned apertures 59 in one end of the cylinder. On the opposite end of the cylinder is a compression spring 61, one end of which engages an end portion 63 of the cylinder and the other of which engages a fixed shoulder 65 on the shaft. The spring urges the cylinder toward the key coupling 56 and keeps the protrusions 57 and the apertures 59 in engagement.

When it is desired to change the relative position of one of the tapes 13, the associated cylinder 55 is urged to a position to compress spring 61, thus releasing the protrusions 57 from the apertures 59. Then the cylinder 57 may be rotated in a clockwise or counterclockwise direction until the indicia on the tape is correctly aligned with respect to the aperture 36 in the intermediate cover plate 35. Upon releasing the cylinder 57, the compression spring 61 urges the protrusions 57 of the key coupling 55 into engagement with the selected apertures 59.

The drive means of the apparatus illustrated in FIG. 3 includes radially extending gear teeth 67 on the outer periphery of one end portion of the cylinder 55. The associated tape has a plurality of longitudinally aligned apertures 69 which mate with the gear teeth 67 of the cylinder. Therefore, rotation of the cylinder causes longitudinal movement of the tape by means of the engagement of the gear teeth 67 and the apertures 63. The shaft 53 is connected with the control knob 51 (see FIG. 1), and the friction rollers 39, 41 are deleted. By rotating control knob 51, the shaft 53 is rotated and the cylinders 55 in turn rotate due to the engagement of the key couplings 56 and the associated apertures 59. The upper roller 77 engages the tapes and urges them against FIG. 1 apparatus are unnecessary by the inclusion of the endless tapes, but tapes like those of FIG. 1 may be used with the FIG. 3 type drive means. Similarly, the drive means of the FIG. 1 apparatus may be utilized with endless tapes.

Another form of my invention is illustrated in FIG. 2. The carriage 71 has an upper cover plate 73 that preferably is pivotally secured thereto. A plurality of tapes 75 are included in the carriage and adapted for longitudinal movement. Drive means includes an upper friction roller 77 rotatably secured to upper cover plate 73 and a lower friction roller 79 secured to carriage 71. When the cover plate is moved downward against the carriage 71, the upper roller 77 engages the tapes and urges them against lower roller 79. By turning control knob 81, the tapes 75 are moved longitudinally and simultaneously so that insurance data appears in apertures 83 of the carriage. When cover plate 83 is raised, the tapes 75 may be adjusted longitudinally to expose different groupings of data.

The tapes 75 of the FIG. 2 apparatus need not be pliable but may be of a rigid material such as paste board. Since the "Balance of Fund" tape must contain many more indicia than the other tapes, several separate "Balance of Fund" tapes are utilized interchangeably so that the carriage 71 need not be of excessive length.

The carriages of any of the above apparatus may be modified to include the statistical data visible through the window 85 of FIG. 1. A stack of individually slidable cards are each separately movable into view from the position 87 shown in phantom. These cards contain insurance statistics that are of interest to prospects such as for example statistics relating to the probabilities of women obaining work at different periods in their lives.

To illustrate other interesting information, the carriage of the above described apparatus may contain another window 89 through which a sliding tape or film 91 is visible. A battery operated light may be placed within the carriage 11 to illuminate the film, and automatic or manual drive means used to operate the film. By using gear means that interconnect with the lower tape receiving cylinders 17, the film 91 may be moved responsive to movements of the friction rolers 39, 41 of the FIG. 1 apparatus.

Among the advantages that derive from my invention is the fact that for the first time the effect of time on insurance needs and the manner which time exhausts insurance funds can be dramatically demonstrated by apparatus small enough to be carried by insurance salesmen. Such apparatus eliminates the need for graphs, charts or scribbling on a scrap of paper. The ease with which the apparatus may be adjusted to fit the insurance needs of any prospect saves valuble time for both salesmen and prospects. The prospect no longer has to sit idly by while the salesman races through graphs and charts.

While I have shown my invention in only a few forms, it will be obvious to those skilled in the art that it is not so limited, but is susceptible of various changes and modifications without departing from the spirit thereof.

I claim:

1. Apparatus for displaying insurance data for sales presentations and the like, said apparatus comprising:

(a) a carriage;

(b) a plurality of parallel tapes mounted to said carriage for longitudinal movement, each of the tapes having groups of indicia that represent insurance data, the indicia of each tape being selectively visible through an associated aperture in said carriage;

(c) a pair of friction rollers disposed within said carriage transversely with respect to the tapes for simultaneously and longitudinally moving the tapes, with the tapes being threaded between said rollers and with one of said rollers being selectively movable in a direction away from the other roller to release the tapes for relative longitudinal adjustments thereof; and (d) storage means connected with said carriage for collecting and dispensing the end portions of said tapes responsive to rotation of said friction rollers.

2. Apparatus for displaying insurance data for sales presentations and the like, said apparatus comprising:

(a) a carriage;

(b) a plurality of parallel tapes mounted to said carriage for longitudinal movement, each of the tapes having groups of indicia that represent insurance data, the indicia of each tape being selectively visible through an associated aperture in said carriage;

(c) drive means connected with said carriage and engageable with said tapes for simultaneously moving said tapes; and (d) said drive means being releasable from the tapes so that relative longitudinal adjustments of the tapes may be made.

3. Apparatus for displaying insurance data for sales presentations and the like, said apparatus comprising:

(a) a carriage;

(b) a plurality of parallel tapes mounted to said carriage for longitudinal movement, each of the tapes having groups of indicia that represent insurance data, the indicia of each of the tapes being selectively visible through an associated aperture in said carriage;

(c) drive means interconnecting the tapes for simultaneously moving the tapes;

(d) said tapes being longitudinally adjustable whereby different groups of indicia are made visible through the apertures.

4. Apparatus for displaying insurance data for sales presentations and the like, said apparatus comprising:

(a) a carriage;

(b) a plurality of rows of material having indicia that represents insurance data, said rows being carried by said carriage;

(c) releasable drive means interconnecting said rows for simultaneously moving said rows; and (d) said rows being adjustable relative to each other when said drive means is released so that different groups of indicia become visible in apertures of said carriage when the drive means is engaged and the rows of material simultaneously moved.

References Cited by the Examiner

UNITED STATES PATENTS

| | | | |
|---|---|---|---|
| 1,246,860 | 11/1917 | Brachtl et al. | 40—86 |
| 1,478,384 | 12/1923 | Dorsch | 40—96 |
| 1,611,538 | 12/1926 | Landman | 40—86 X |
| 1,749,933 | 3/1930 | Barnett | 40—86 X |
| 1,803,118 | 4/1931 | Little | 40—96 |

EUGENE R. CAPOZIO, *Primary Examiner.*

W. J. CONTRERAS, *Assistant Examiner.*